United States Patent [19]

Myers

[11] 4,372,351
[45] Feb. 8, 1983

[54] WIRE TREE BASKETS AND A METHOD AND APPARATUS FOR FORMING SAME

[75] Inventor: John W. Myers, Greensboro, N.C.

[73] Assignee: Hemco Wire Products, Inc., Greensboro, N.C.

[21] Appl. No.: 289,661

[22] Filed: Aug. 3, 1981

[51] Int. Cl.³ .................. B21F 15/08; B21F 27/10
[52] U.S. Cl. .................. 140/112; 140/71 R; 220/19; 219/56; 269/40; 269/57; 269/289 R
[58] Field of Search .................. 140/112, 92.1, 71 R, 140/102; 220/19; 269/289 R, 289 MR, 55, 57, 40, 41, 43; 219/56

[56] References Cited

U.S. PATENT DOCUMENTS

| | | | |
|---|---|---|---|
| 1,012,968 | 12/1911 | Bartz | 140/112 |
| 2,439,548 | 4/1948 | Planeta | 140/71 R |
| 3,678,971 | 7/1972 | Nordgren | 219/56 |
| 3,920,170 | 11/1975 | Colburn et al. | 219/56 |
| 3,979,856 | 9/1976 | Belcher | 220/19 |

Primary Examiner—Francis S. Husar
Assistant Examiner—Linda McLaughlin

Attorney, Agent, or Firm—Charles R. Rhodes; Judith G. Smith

[57] ABSTRACT

A frusto-conical shaped wire basket is formed of a plurality of upright wire loops welded in substantially perpendicular relationship to a plurality of wire rings. The baskets are formed by first welding wire connecting members to a plurality of arcuately shaped lengths of wire. Each of the arcuate lengths is of a different length and radius, and they are arranged concentrically in order of decreasing radius. The relative lengths of the arcuate segments are determined by the desired size of the finished basket. When the wire connecting members are welded to the arcuate segments in the first stage of basket production, there is formed a basket flat. The flat is then subjected to a conventional pinch roller mechanism which bends the flat into a conical shape. At that point the ends of each arcuate length are in face-to-face relationship and form a circle. The ends are then butt welded to close each circular ring to complete the wire basket. A unique welding fixture holds and presents the arcuate members and connecting members to a spot-welding machine for facilitating the forming of the basket flats.

3 Claims, 6 Drawing Figures

WIRE TREE BASKETS AND A METHOD AND APPARATUS FOR FORMING SAME

BACKGROUND AND SUMMARY OF THE INVENTION

Frusto-conical shaped wire baskets are well known for use in containing the root ball of a tree or shrub. Equipment for digging and balling generally includes a plurality of spades which are positioned around the base of the tree which is to be transplanted. The spades are then activated to dig down into the earth around the tree roots and lift the tree out of the ground. When the tree is lifted, the earth is simultaneously compacted into a ball around the roots, and the ball is then placed in a container for transporting. Such equipment is disclosed in U.S. Pat. Nos. 3,618,234 and 3,713,234.

Various types of containers have been utilized to maintain the tree ball and protect the root system of the tree. Such containers must maintain the tree ball in a compact state, as free as possible from cracks, and should be of minimal weight to reduce shipping costs and difficulties in handling, and are preferably transplanted with the tree. In meeting at least the above standards, wire baskets have become the container preferred by many nursery operators. However, certain disadvantages exist with baskets currently in use and in their manufacture.

A first problem is associated with the manufacturing of the wire baskets. Because of the pluralities of wire elements which must be welded together to make one basket, the conventional manufacturing method is expensive. The circular rings are first made and then welded to upright side wires or loops in a time-consuming operation wherein much of the welding is performed one joint at a time.

Additionally, the type of wire used in the baskets is unsatisfactory. Known manufacturing methods utilized a galvanized wire for the baskets. Galvanized wire does not bend easily, when bent does not take a set, and it is therefore difficult to make any adjustments to the basket to tighten it around the root ball if desired. Further, galvanizing is the coating of metal to prevent or inhibit rusting. As a result galvanized wire baskets require a long period of time for corrosion and breaking down of the wire to occur. A galvanized wire basket can take as long as twenty years to corrode and disintegrate. While the roots of the tree can of course grow over and through the wires of the basket, the growth process is improved if the basket is rapidly disintegrated. Additionally, as the basket corrodes it fertilizes the tree. Thus rapid corrosion of the wire is advantageous for a number of reasons.

The present invention is directed to a wire basket and the method and apparatus for making the baskets at approximately one-third of the previously known cost. In addition to more economical production methods, the wire baskets according to a preferred embodiment are made of annealed wire rather than galvanized. The use of annealed wire allows the side wires or loops of the basket to be twisted or bent as necessary to tighten a basket around the tree ball. Further, after the tree is transplanted, the uncoated annealed wire quickly corrodes and disintegrates within a period of weeks or months rather than years. As the basket corrodes, the disintegrating metallic elements provide nutrients to the soil in the early stages of tree growth.

A second similar type of tree basket is designed to support tomato vines. The tomato basket is generally of a taller height and smaller diameter than the tree baskets. Further, in constructing the tomato baskets, straight vertical sidewires are welded to the arcuate segments, rather than vertical wire loops as utilized in the tree baskets. Otherwise, construction methods for the tree and tomato baskets are the same. The tomato basket is also a truncated conical shape tapering inwardly from top to bottom of the basket, with the bottom of the basket having an angle of approximately 85° to the horizontal plane.

The construction method for both types of wire baskets involves the use of a unique welding fixture for first forming a basket flat, which flat is then subjected to a bending operation to impart the desired conical shape to the finished basket.

The welding fixture comprises a flat wooden board preferably cut into a 180° semicircular shape and having a planar top surface. The board is adapted to be rotatably mounted between the electrodes of a conventional welding machine (known as cross wire resistance welding or projection welding) for welding a plurality of wire pieces together to form the basket flat. The upper planar surface of the welding fixture includes a pattern of arcuate grooves for receiving the lengths of wire which ultimately become the circular rings of the basket; and a plurality of loop-shaped or straight grooves which receive the wire loops or members that form the upright side portions of the basket. The arcuate grooves are cut into the welding board in a pattern wherein the outer groove is of one radius, and the arcuate grooves which lie in concentrically spaced relationship to each other toward the mid-portion of the welding board are of constantly decreasing radii; the smallest arc lying closest to the pivot point of the board which is at the center of the straight edge.

The grooves which receive the wire loops or members are positioned in arcuately spaced relationship to each other and extend along substantially radial grooves intersecting the arcuate grooves. In use, straight lengths of wire, which will form the circular rings of the finished basket, are laid in the arcuate grooves and the closed wire loops or straight members are placed in the radial grooves, overlying the arcuate wires. The welding fixture is then pivoted to a plurality of stops between the electrodes of the welding element which welds the connecting members to the arcuate wires at each intersecting point. After the welding operation is completed the basket flat is removed from the welding fixture and forwarded to the next operation.

The next step in production is subjecting the basket flat to a bending machine such as a pinch roller mechanism. When the basket flat is run through the bending machine it bends into a conical shape such that the ends of each of the arcuate wires are substantially face to face, forming a circular ring. The ends of each wire are then butt welded to each other to close each of the rings and complete the basket. When the basket is completed it is essentially conical in shape, tapering inwardly from top to bottom. The diameters of the circular rings are chosen according to the desired size of the finished basket, with the upper ring having the largest diameter and the lower ring having the smallest diameter. The number of intermediate rings varies according to the size of the basket as does the number of upright loops or members. The baskets can be made in a large variety of diameters, most commonly in the range of from fourteen inches to forty-two inches (diameter of top ring). The angle of the side walls of the basket to the horizontal plane is preferably 75°, but other angles in the range of 65° to 85° may be utilized. The upright loops (tree baskets) extend beyond the upper and lower circular rings and are used to attach ropes or twine which lace or tie the tree ball into the basket. As previously mentioned, the use of annealed wire aids in making bends in the loops to adjust the basket and the lacing tightly around the tree ball.

The production methods for both baskets are explained in more detail below, and have been found to be highly improved in efficiency and a significantly more economic means of manufacture.

The objects of the invention therefore include:

1. the provision of an improved wire basket for tree balls;
2. the provision of an improved wire basket which is more easily adjusted or tightened around a tree ball;
3. the provision of a wire tree basket which will quickly corrode and disintegrate after the tree is transplanted;
4. the provision of an improved, efficient and economical method of making wire tree baskets;
5. the provision of a wire basket for supporting tomato plants;
6. the provision of an improved method of producing wire baskets in a variety of sizes; and
7. the provision of an apparatus for welding wire basket flats.

Other and further objects of the present invention will become obvious as the following detailed description is studied in conjunction with the accompanying drawings of which:

DETAILED DESCRIPTION OF A PREFERRED EMBODIMENT

Figure 1:
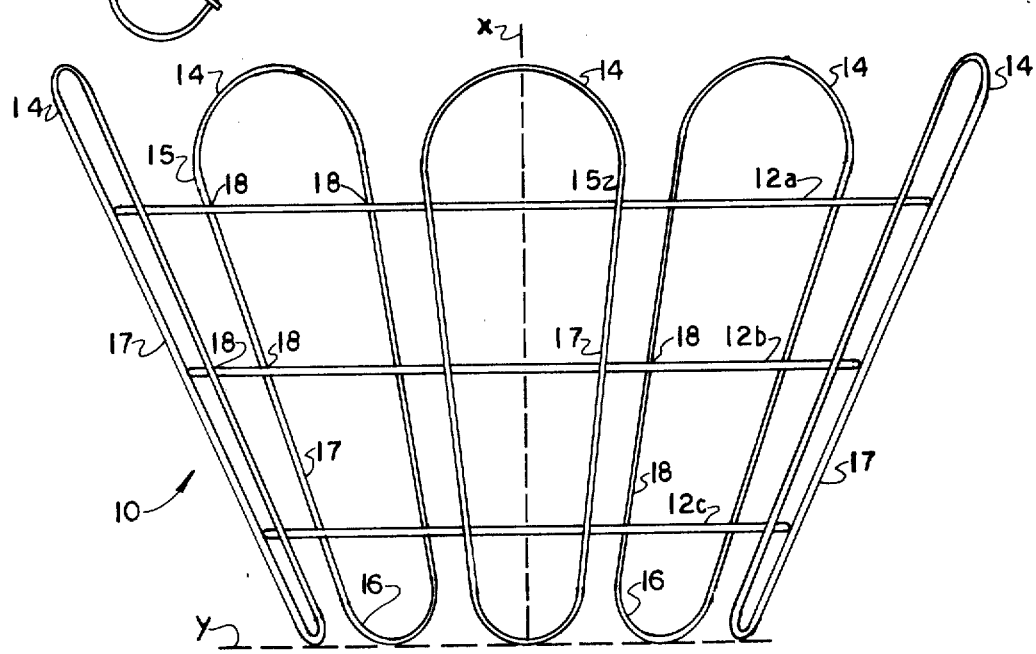
FIG. 1 is a side view of a tree basket according to the present invention.

Looking first at FIG. 1 the improved tree basket 10 is shown to include a plurality of vertically spaced wire rings 12a, b, and c, and a plurality of horizontally spaced, generally upright, wire loops 14. The circular rings 12 are disposed in perpendicular relationship to the vertical axis X shown by the phantom line drawn through the center of the basket. The loops 14 include an upper, enlarged end 15, a lower, relatively smaller end 16 and connecting side portions 17.

As shown, the upper and lower ends of the loops 14 extend above and below the circular rings 12a and 12c respectively, with the side portions 17 spot welded to the rings 12 at each intersecting point 18. As previously explained the basket 10 is preferably made from annealed wire, or wire that has been heat treated to reduce brittleness and increase its malleability. When a tree ball is inserted into one of the baskets 10, the upper and lower ends of the loops are bent snugly around the tree ball and retained by twine or cords. After the tying operation is completed, if one of the ties or laces should become loose it is simple to twist the wire loop to tighten the lacing. Additionally, the wire rings 12 can be twisted to tighten the basket if necessary. The annealed wire is easily bent or twisted with conventional tools and takes a set readily such that the lacing and/or basket remains secure around the tree ball.

The shape of the basket 10 is that of an inverted truncated cone (frusto-conical), tapering to a relatively smaller diameter bottom portion. Such shape is achieved by forming the circular rings 12 in differing diameters and arranging them in relationship to each other so that the largest diameter, 12a, is at the top of the basket and the smallest diameter, 12c, is at the bottom. The diameters are selected and positioned in combinations to ensure that the angle of the basket side wall with respect to a horizontal plane (phantom line Y) is 75° for any size basket. This preferred angle has been found most compatible with conventional equipment used in transplanting trees and shrubs. Other angles can be utilized but they should remain within the range of 65° to 85°.

Examples of ring diameters required for a variety of basket sizes are given below following the description of the welding equipment used to make the basket flats. The equipment used in producing the wire basket 10 is of a conventional type except for the unique welding device used for forming the basket flats 20 shown in FIG. 3.

Figure 2:
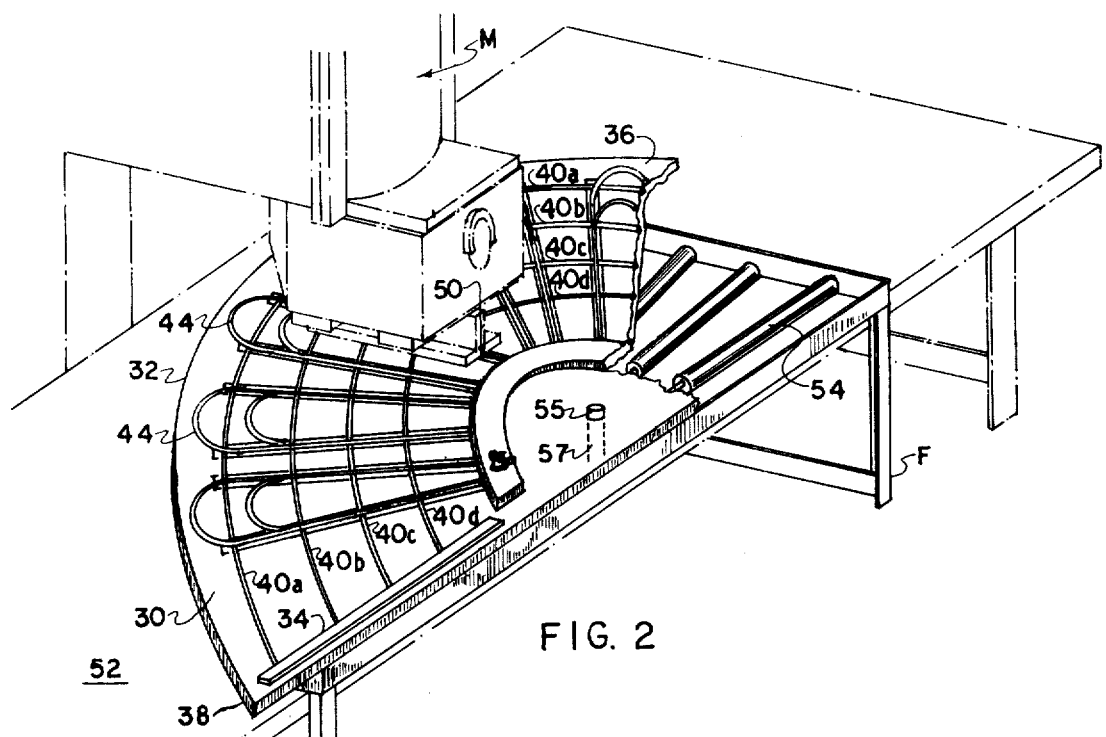
FIG. 2 is a perspective view of the welding fixture of the present invention with parts broken away to show the roller arrangement underneath the fixture.

The basket flats 20 are formed on a welding fixture or board 30 shown in FIG. 2 as it would be installed on a conventional cross-wire resistance welding machine M (parts broken away). The board 30 is preferably semicircular in shape and formed of material such as wood or other rigid, durable non-conductive material such as plastic. There is an arcuate edge 32, a straight edge 34, and a planar top surface 36.

Arcuate grooves 40 are cut into the planar surface 36, spaced apart in concentric relationship, and of different radii, graduating from the largest at 40a to the smallest at 40c. Loop-shaped grooves 44 intersect the arcuate grooves 40 to receive the preformed wire loops 14. The grooves 44 extend entirely through the board 30 at least at points beneath the intersection of arcuate wires 13 and loop wires 14 so that open communication between the electrodes is provided. When the wire segments 13 have been cut to prescribed lengths necessary to form the circular rings, the lengths of wire 13 are placed in the appropriate groove 40. Loops 14 are then placed in the looped grooves 44. At that point the welding fixture 30 is rotated between the electrodes the welder 50 for welding each point where the loops 14 intersect the arcuate wire segments 13. The conventional welder, long known to the industry, can weld a plurality of junctions in one motion. Therefore, as the operator rotates the fixture 30 under the welder 50, it is stopped at a point aligned with each side wire 17 and each juncture of a wire 17 to the arcuate wires 13 is welded at once.

The welding fixture 30 is rotatable on rollers which are mounted in a frame F in association with support table 52 for selective engagement with the underside 38 of the fixture 30. The rollers 54 are spring loaded for up and down movement of the board 30 through an appropriate cutout(s) in table 52. When it is desired to rotate the board the operator activates a foot pedal (not shown) beneath the welding machine which releases the spring-loaded rollers so that they will lift the fixture above the supporting surface 52. During welding the foot pedal is deactivated such that the rollers retract and the welding fixture 30 drops to rest on the supporting surface 52. In such position the fixture 30 will not move until the welding function is completed at one position and the operator reactivates the rollers to move the fixture to the next position.

Figure 2A:
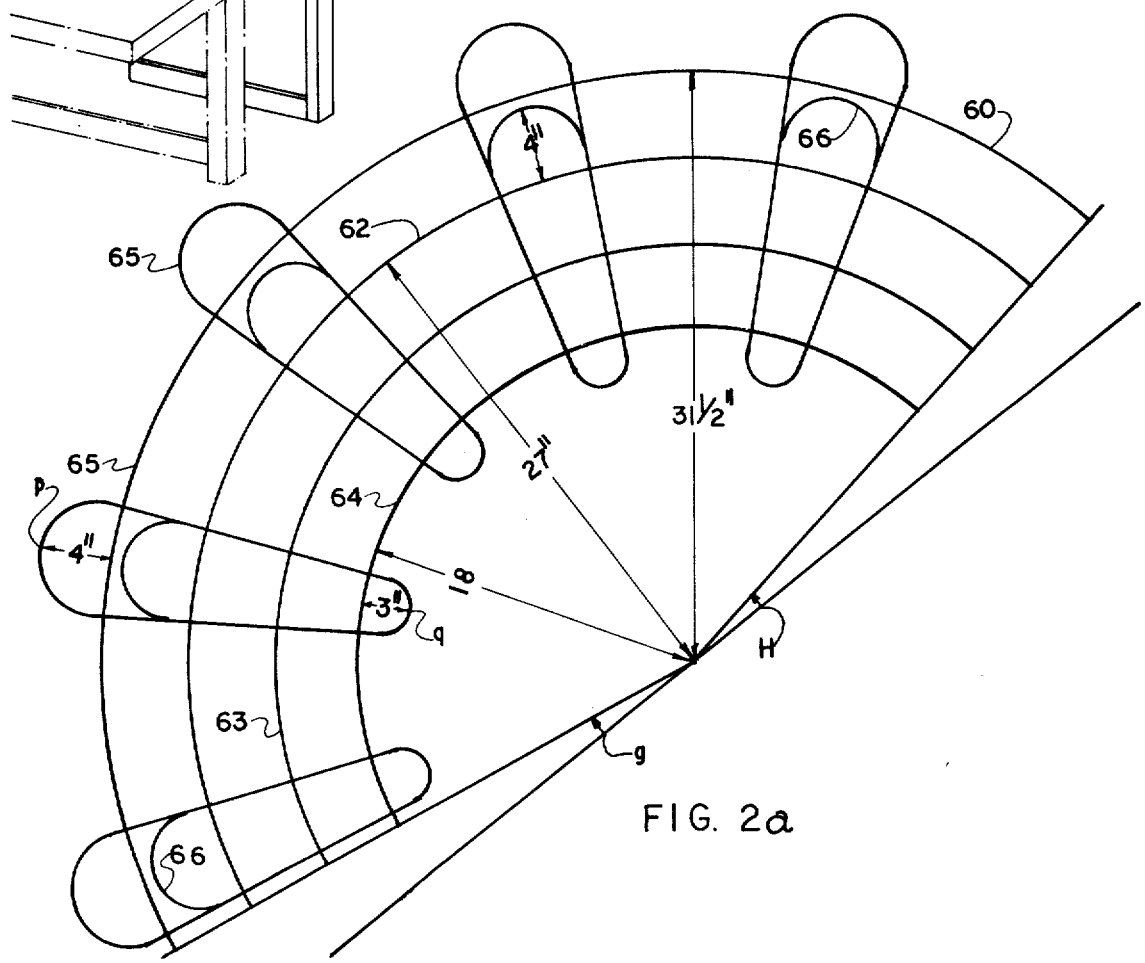
FIG. 2a is a chart schematically illustrating the layout of the grooves on the surface of the welding fixture for baskets of given dimension.

The fixture 30 is rotated about a fixed pivot point 55 comprised of a vertical rod 57 which extends upwardly from the supporting surface 52 of the machine M and through the fixture 30. The pivot point 55 is fixed at a point coinciding with the center of the arcuate grooves 40, and is a reference point for calculating the radius of each arcuate groove 40. FIG. 2a is a schematic representation of the groove pattern utilized on a welding fixture 30 designed for making twenty-four to twenty-eight inch baskets.

In that diagram, angles "g" and "h" are both equal to 10°. When each is subtracted from the available 180° which is the straight line on which the pivot point is fixed, there remains 160° for forming the arcuate wire segments. Therefore 160° equals 1/2.25 of an entire circle which is the constant factor used in calculating the various radii. For example, the diagram in FIG. 2a illustrates a line 60 that represents a groove for making the top circular ring 12a of a basket 28 inches in diameter. The arc of that line 60 must have a radius of 31.5 inches which is calculated as follows:

$$28''\text{(basket diameter size)} \div 2 = 14 \text{ (radius)}$$

$$14 \times 2.25 = 31.5$$

For the intermediate groove 40b, represented by line 62 in the diagram, or for making the upper ring of a twenty-four inch basket, the calculation is:

$$24 \div 2 \times 2.25 = 27$$

The lower ring, represented by line 64, having a diameter of sixteen inches is calculated in the same manner as is the second intermediate ring or line 63.

Thus the grooves 40 are cut into the surface 36 of the fixture at a given radius from the point 55.

The looped grooves 44 are calculated such that the upper arcuate portion, or enlarged end of the loop, extends four inches to nine inches above the top circular wire of a twenty-eight inch basket. The lower arcuate portion, or smaller loop extends three inches to eight inches below the bottom ring.

The radius of the arcs on the ends 15, 16 of the loops is determined by the overall size of the basket and the distance it is desired that the respective loops extend above or below the top or bottom circular rings. Thus the patterns for a twenty-eight inch and a twenty-four inch basket may be laid out on one welding board 30. Line 65 represents the enlarged looped end 15 of a twenty-eight inch basket. The lower ends 16 would preferably have the same distance of extension from the lower circular ring 12 on a twenty-four or twenty-eight inch basket.

When the welding fixture 30 has been prepared for a prescribed basket size, and the fixture mounted on a conventional spot welding machine, production of the basket 10 is as follows. Annealed wire of a prescribed gauge is cut to appropriate lengths using conventional cutting tools. For one twenty-eight inch basket an operator must cut segments of wire of five different lengths. One segment to make the top ring 12a (FIG. 1). Two segments to make intermediate ring(s) 12b. One segment to make ring 12c. Five segments must be cut to a predetermined length to form the five upright loops 14. If making the tomato basket 100, these wires are cut to length for use as straight sidewires 140. The two pluralities of segments are cut in multiples of the number of baskets being made.

The next step is the formation of loops 14. (Delete this step if making tomato basket 100). The five segments designated to form the loops are bent into a loop configuration using a conventional bending machine. The ends are then butt welded to close the loop.

Figure 3:
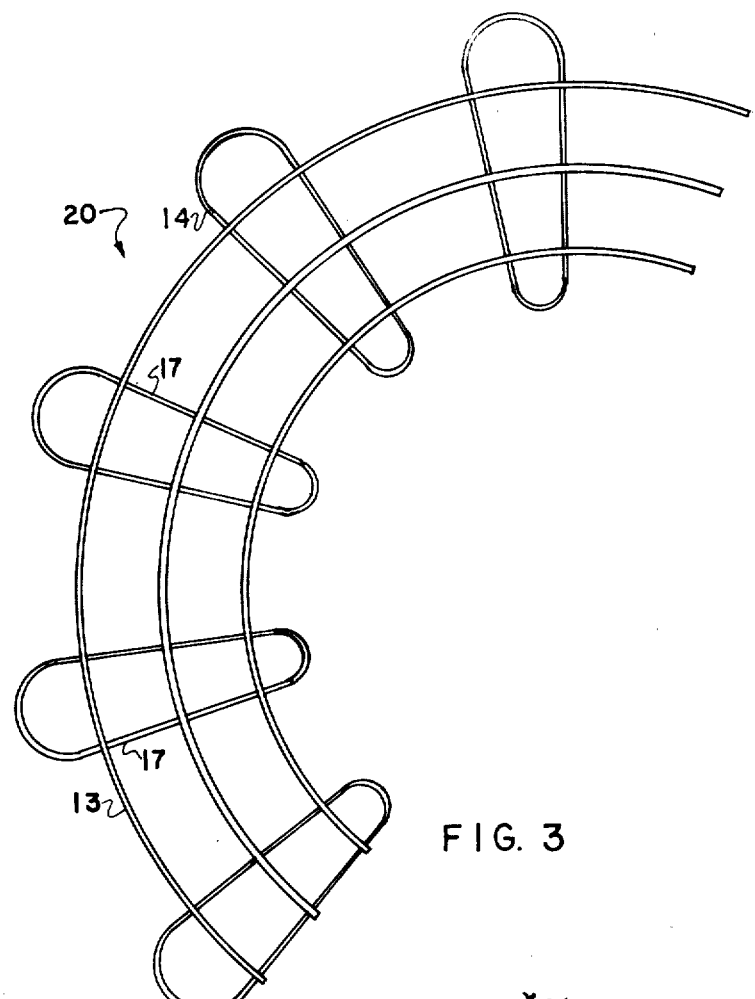
FIG. 3 is a plan view of a basket flat according to the present invention.

Following formation of the loops the three or four arcuate segments are placed in the respective grooves 40a, 40b, 40c, or 40d on the upper surface 36 of the welding fixture. The completed loops are then placed in grooves 44 overlying the arcuate wires. When the wires and loops are in place on the fixture, the fixture is rotated under the welding head 50 which welds the side portions 17 of the loops to each intersecting arcuate wire. That completes one basket flat 20 as shown in FIG. 3.

The basket flat 20 is then passed through a conventional pinch roller mechanism which forms the flat into a conical shape. The terminal ends of each arcuate wire will then be in face-to-face relationship to form circular rings 12a, 12b, 12c and 12d. The ends are then butt welded to close the rings. No further operations are performed as the basket is now complete. The loops are bent into position around the tree ball as a tree ball is laced or tied into the basket.

Figure 4:
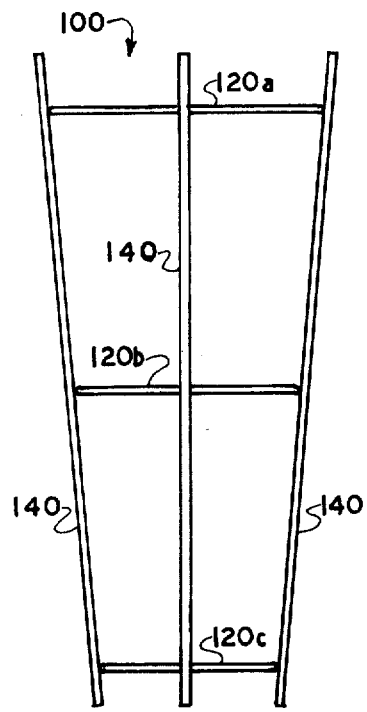
FIG. 4 is a side view of a wire basket for supporting tomato plants.
Figure 5:
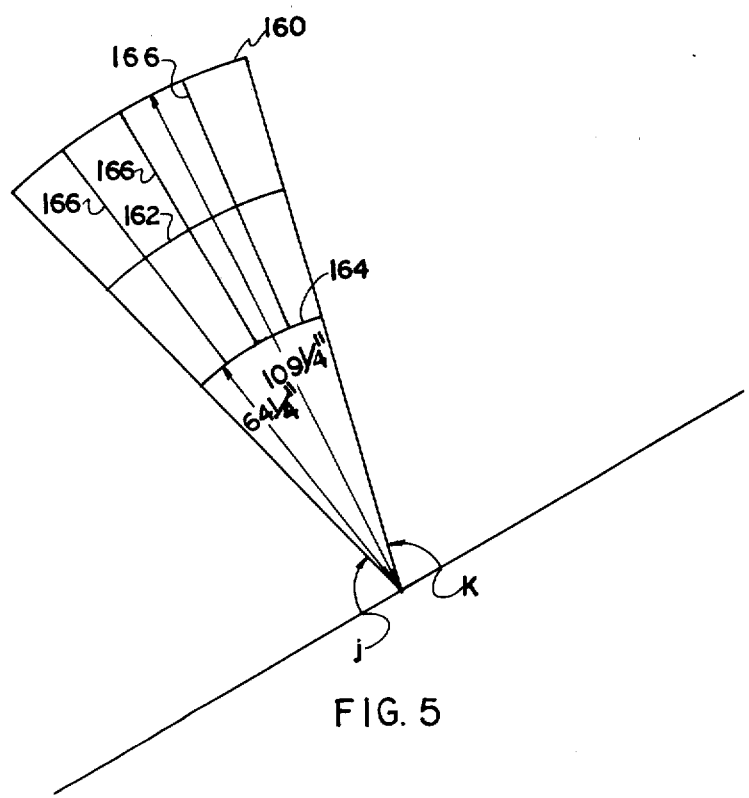
FIG. 5 is a chart illustrating the layout of grooves on the surface of the welding fixture used to construct the basket of FIG. 4.
Figure 6:
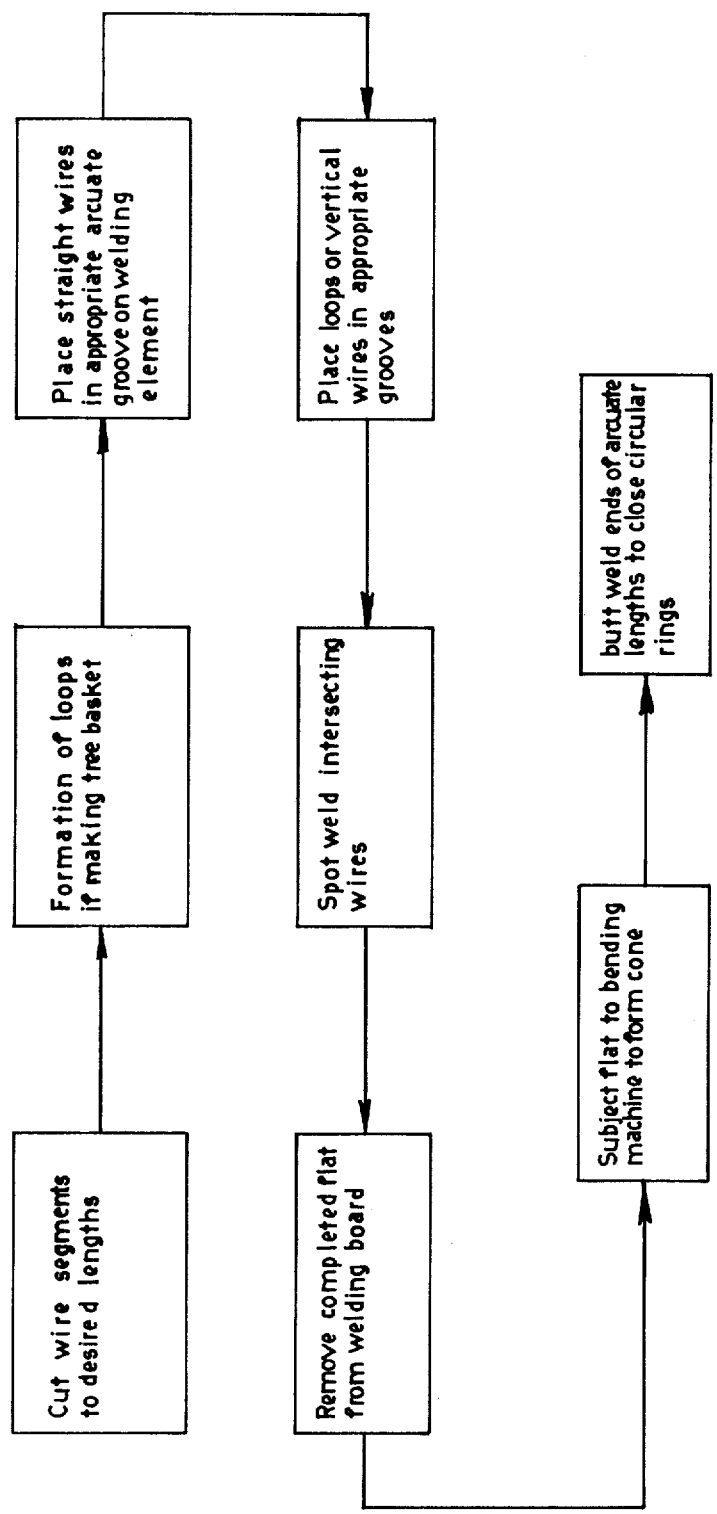
FIG. 6 is a block diagram illustrating the steps in the method of producing wire baskets according to the present invention.

The construction of the tomato basket 100 shown in FIG. 4 is basically identical to that of the tree basket 10. A chart illustrating the groove pattern for the welding board 30 is shown in FIG. 5. The basket 100 is generally comprised of circular rings 120, straight, vertically extending sidewires 140, and tapers outwardly from top to bottom. The circular rings are of varying diameter decreasing from the larger ring 120a at the top to the smaller diameter bottom ring 120c. Lines 160,162 and 164 in the FIG. 5 pattern represent the arcuate grooves on a welding element 30 which would be used to construct a tomato basket flat according to the previously described method. Lines 166 represent the grooves which will receive the straight wires 140 for spot welding. When the basket flat is completed it is also subjected to a pinch roller mechanism for shaping into a conical form. The calculations for making the circular rings 120 are the same as for the tree basket with the exception that the angles "j" and "k" (which are analogous to angles "g" and "h" respectively) are 76° rather than 10° for the preferred tree basket. The steps in the method of construction are the same with the exception that there is no formation of loops. The vertical wires 140 are cut to a prescribed length according to the height of the completed basket 100. Depending on the size of the tomato basket there may be three to six circular rings 120 and three to four vertical wires 140. Tomato baskets of a thirty-six inch height would preferably have five rings 120 with the top ring 120a having a sixteen-inch diameter and the bottom ring 120c a ten-inch diameter. Intermediate ring(s) 120b would be of intermediate diameter(s). A forty-five inch high basket 120 would preferably have a top diameter of seventeen inches and bottom ring diameter of ten inches. All size baskets would preferably have a side wall angle of 85° in relation to horizontal.

It is thus seen that an improved wire basket, and an apparatus and method for construction thereof has been described. While a preferred embodiment has been described, it is recognized that other and further modifications may be made by those skilled in the art without departing from the scope of the claims below.

What is claimed is:

1. A method of producing a truncated cone shaped wire basket formed of a plurality of wire rings of differing diameter joined by vertical wire members, the steps of said method comprising:
   (a) cutting a wire strand material of desired metallic content and gauge into a plurality of first segments with each segment being of a length corresponding to the circumference of one of the various circular rings which form the side wall of the completed basket;
   (b) cutting additional lengths of said wire material into second segments which are of a length to form the vertically extending, horizontally spaced wire members which connect the circular rings to form the completed baskets;
   (c) bending each one of said first segments into an arc having a prescribed radius less than that of a complete circle;
   (d) arranging the plurality of wire arcs on a substantially flat surface in concentrically arranged spaced relationship to each other;
   (e) placing said second wire segments onto said flat surface in horizontally spaced relationship to each other, and into engagement with the arcuate segments;
   (f) welding all intersecting points of said arcuate segments and said vertical segments to form a basket flat;
   (g) subjecting said basket flat to a bending machine to shape said flat into a truncated conical shape; whereby the ends of said arcuate segments will be in substantially end-to-end, abutting relationship to form a circle;
   (h) joining the ends of said arcuate segments to close the circular rings, thereby completing the wire basket.

2. The method of producing a wire basket according to claim 1 wherein said step (e) comprises the preliminary sub-steps of:
   (a) forming said second segments of wire which form the vertically extending portions of said basket into loops which have a first enlarged looped end, an opposed smaller looped end and substantially straight side portions connecting said first and second ends;
   (b) butt welding the ends of each wire to close the loop;
   (c) arranging said closed looped portions over said arcuate segments in substantially perpendicular relationship thereto.

3. The method of producing the wire basket of claim 1 in which steps (d) and (e) are carried out by placing said first and second wire segments into preformed grooves in a welding fixture, holding said wire segments in place while subsequently moving said welding fixture past a welding head according to a prescribed pattern to join all intersecting points of said first and second segments.

* * * * *